United States Patent [19]

Suzuki et al.

[11] 4,188,623
[45] Feb. 12, 1980

[54] TEMPERATURE RESPONSIVE APPARATUS EMPLOYING A THERMOCOUPLE

[75] Inventors: Seiko Suzuki; Masahiro Takasaka; Toru Sugawara; Toru Takahasi, all of Ibaraki, Japan

[73] Assignee: Hitachi, Ltd., Japan

[21] Appl. No.: 819,993

[22] Filed: Jul. 28, 1977

[30] Foreign Application Priority Data

Jul. 28, 1976 [JP] Japan .................................. 51/89198
Aug. 27, 1976 [JP] Japan ................................ 51/101614

[51] Int. Cl.² .............................................. G08B 17/06
[52] U.S. Cl. .................................... 340/595; 307/117; 335/153
[58] Field of Search ................. 340/595, 501; 335/153, 335/151; 307/117; 361/161, 165, 170

[56] References Cited

U.S. PATENT DOCUMENTS

| 3,185,974 | 5/1965 | Doane ................................. 335/153 |
| 3,906,476 | 9/1975 | Yonezu ............................... 340/501 |
| 3,921,453 | 11/1975 | Platzer, Jr. ......................... 340/595 |
| 4,083,025 | 4/1978 | Meuller et al. ...................... 335/153 |
| 4,112,478 | 9/1978 | Takahasi et al. ..................... 340/593 |

FOREIGN PATENT DOCUMENTS

640150  5/1934  Fed. Rep. of Germany ........... 361/161

*Primary Examiner*—Glen R. Swann, III
*Attorney, Agent, or Firm*—Craig and Antonelli

[57] ABSTRACT

A temperature responsive apparatus includes a thermocouple producing a thermoelectric e.m.f. depending on the temperature difference between a temperature to be detected and a circumferential temperature and a first winding supplied with current from the thermocouple to generate a first magnetic field. A second winding is connected to a voltage source to generate a second magnetic field in the opposite direction to that generated by the first winding and a reed switch is positioned in the total magnetic field generated by the first and the second windings so as to respond to the intensity of the total magnetic field to make and break its contacts. A diode is also connected to the voltage source, and the second winding is always excited in accordance with the voltage drop across the diode to maintain said second magnetic field.

22 Claims, 8 Drawing Figures

TEMPERATURE RESPONSIVE APPARATUS EMPLOYING A THERMOCOUPLE

BACKGROUND OF THE INVENTION

The present invention relates to a temperature responsive apparatus employing a thermocouple, and more particularly to an apparatus which has a reed switch excited by the output of the thermocouple.

It is quite well known in the art that the output voltage of a thermocouple can be easily affected significantly by a change in the circumferential or ambient temperature. Accordingly, when the thermocouple is utilized for an apparatus which is required to strictly respond to a specified temperature to be detected without any influence by the circumferential temperature, some type of temperature compensation becomes necessary.

For example, a Japanese patent publication No. 46-39814, published on Nov. 24, 1971, discloses an apparatus providing compensation for changes in the circumferential temperature. According to this publication, particularly to FIG. 1 thereof and the accompanying description, the apparatus has a reed switch and three windings. The reed switch is connected to a voltage source through a relay winding of a relay which closes its contacts when the reed switch is closed. A first winding is connected to a thermocouple and is supplied with the thermoelectric current therefrom to generate a magnetic field through the reed switch. A second winding is connected across the voltage source and provides a magnetic field so as to bias the reed switch in the same direction as that generated by the first winding. A third winding is connected through a thermistor across the relay winding and generates a magnetic field in the opposite direction to those generated by the first and the second windings.

In this apparatus, when the output of the thermocouple reaches a predetermined value, the total magnetic field intensity generated by both the first and second windings exceeds a predetermined threshold value, so that the reed switch is closed. Current flows through the third winding in accordance with the voltage appearing across the relay. Thereby, a reverse bias is produced through the reed switch. Since the current flowing through the third winding is controlled by the thermistor, the operation of the device can be compensated in accordance with the flucutuation of the circumferential temperature.

The current, however, flows through the third winding only when the reed switch is closed; thus, there is no current for compensation of current operation until the reed switch is closed. This means that no compensation can be achieved at the time when the reed switch begins to operate.

SUMMARY OF THE INVENTION

An object of this invention is to provide a temperature responsive apparatus in which the compensation provided for changes in the circumferential temperature is more uniformly effective.

The object mentioned above is achieved by a temperature responsive apparatus comprising a voltage source, a thermocouple producing a thermoelectric e.m.f. depending on the temperature difference between a temperature to be detected and a circumferential temperature, a first winding supplied with current from the thermocouple to generate a first magnetic field, a second winding generating a second magnetic field in the opposite direction to that generated by the first winding, and a reed switch positioned in the total magentic field generated by the first and the second windings, the reed switch being responsive to the intensity of the total magentic field to make and break its contacts. In accordance with the invention, there is provided means connected to the voltage source and having a variable voltage drop thereacross in dependence of the circumferential temperature, the second winding being always excited in accordance with said voltage drop.

Further, according to an embodiment of the invention, a diode is utilized for said means having the variable voltage drop thereacross, so that the accurate and stable operation of the apparatus can be obtained free from the fluctuation of the voltage of the source.

Furthermore, according to another embodiment of the invention, there is further provided a compensating circuit which provides additional current to the second winding while the reed switch is closed, so that the bias magnetic field intensity by the second winding during the opening of the reed switch is different from that during the closure of the reed switch. This serves for the minimization of a so-called hysteresis characteristic which is inherent in the reed switch.

DETAILED DESCRIPTION OF THE PREFERRED EMBODIMENTS

Figure 1:
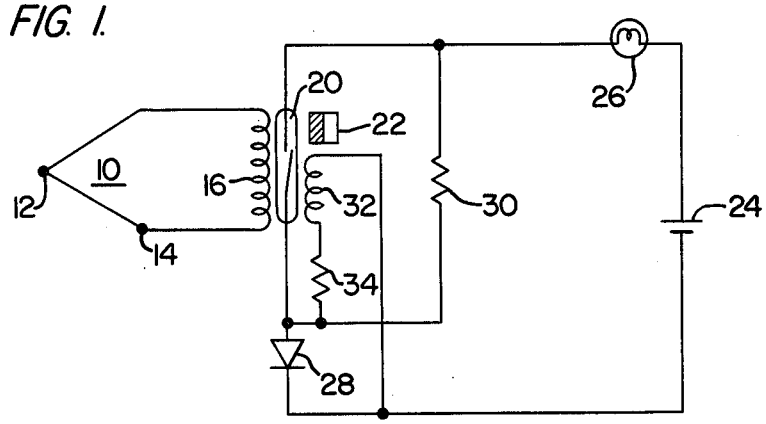
FIG. 1 is a schematic diagram of a temperature responsive apparatus in accordance with an embodiment of the present invention.

In FIG. 1 there is illustrated a temperature responsive apparatus which can be installed in a car in order to detect the overheating of a catalytic converter for reducing exhaust pollutants. Such apparatus must be able to warn the driver of a high operational temperature, such as 850° C., of the catalytic converter, which leads to malfunction of the converter.

The temperature responsive circuit has a thermocouple 10 which consists of two dissimilar metals and has a hot junction 12 and a cold junction 14. Usually the hot junction 12 is interposed within the catalytic converter and the cold junction 14 is positioned to be exposed to the circumferential or ambient temperature. The thermocouple 10 generates a thermoelectric e.m.f. proportional to the temperature difference between the hot and cold junctions 12 and 14. A first winding 16 is wound on or disposed beside a reed switch 20 and is connected between the junctions 12 and 14 so that a magnetic field is generated through the reed switch 20. The magnetic field intensity of the first winding 16 increases in accordance with the current which is supplied from the thermocouple 10, and the reed switch 20 comes to be closed when the magnetic field intensity exceeds a certain threshold value.

A permanent magnet 22 is disposed beside the reed switch 20 and generates the bias magnetic field therethrough in the same direction as that formed by the first winding 16. The permanent magnet 22 can provide a magnetic field of almost constant intensity to the reed switch 20 over the range from −50 to 150° C., and it can be replaced with a winding. The upper end of the reed switch 20 is connected to the positive pole of a battery 24 through a warning lamp 26 which is disposed on the dashboard of the car, and the lower end thereof is connected to the negative pole of the battery 24 through a diode 28 connected in the forward direction. The warning lamp 26 can be provided anywhere in the closed circuit which is formed by the reed switch 20, the battery 24 and the diode 28. Another type of warning device, for example a buzzer, can be substituted for the warning lamp 26.

A resistor 30 is connected in parallel to the reed switch 20, which resistor 30 forms a closed circuit together with the diode 28, the voltage source 24 and the warning lamp 26, and current flows therethrough when the reed switch 20 is open. The current is suppressed by the resistor 30 under such circumstances to a value such that the lighting of the warning lamp 26 almost cannot be noticed by the driver. A second winding 32 is also wound on or adjacent the reed switch 20 and is connected across the terminals of the diode 28 through a resistor 34. Current flows therethrough in accordance with the forward voltage appearing across the diode 28. The second winding 32 is so designed that it also generates a magnetic field through the reed switch 20, but in the opposite direction to that generated by the first winding 16. The diode 28 has a tendency that its forward voltage drop changes in accordance with the circumferential temperature. The current flowing through the second winding 32 therefore, can be regulated in response to the change of the circumferential temperature.

Another kind of diode, for example, a Zener diode, can be substituted for the diode 28. Further, it will be easily understood that other elements, the resistance of which changes in accordance with the temperature, such as thermistors, can be utilized in place of the diode 28, although a diode is peferred for reasons to be stated hereinafter. All the elements mentioned above are disposed within the same circumferential temperature, except the hot junction 12, which is interposed in the catalytic converter.

The operation of the temperature responsive apparatus mentioned above will be described by reference to FIG. 2 in which the vertical axis indicates the magnetic field intensity applied to the reed switch 20 and the horizontal axis indicates the circumferential temperature. The threshold value at which the reed switch 20 is closed is indicated by the value Hon on the vertical axis.

Figure 2:
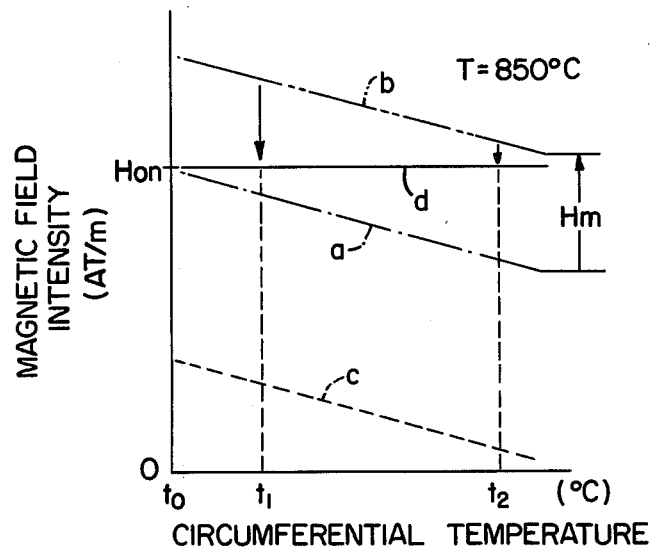
FIG. 2 shows the operating characteristic of the temperature responsive apparatus illustrated in FIG. 1 against circumferential temperature.

As mentioned above, the thermocouple 10 generates a voltage output that is proportional to the temperature difference between the hot junction 12 and the cold junction 14, i.e., the difference between the operating temperature of the catalytic converter and the circumferential temperature. The magnetomotive force X of the first winding 16 is as follows:

$$X = \frac{4.2(T-t) \cdot N}{(R_n + R_c) \cdot 10^5} (AT) \alpha H \tag{1}$$

where N is the number of turns of the first winding 16, T the operating temperature of the converter, t the circumferential temperature, $R_n$ the resistance value of the thermocouple 10 and $R_c$ the resistance value of the first winding 16. The magnetic field intensity applied to the reed switch 20 by the first winding 16 is shown in FIG. 2 by a one-dot chain line a, when the temperature at the hot junction 12 is 850°C. As is apparent from the figure, the intensity of the magnetic field decreases in reverse proportion to the circumferential temperature because of the decrease of the temperature difference between the hot and the cold junction 12 and 14. Even if the magnetic field intensity of the first winding 16 is set at Hon for a certain circumferential temperature to, it becomes insufficient to close the reed switch 20 with the increase of the circumferential temperature (see $t_1$ and $t_2$).

A two-dot chain line b shows the total magnetic field intensity of the first winding 16 and the permanent magnet 22. The intensity of the magnetic field provided by the magnet 22 is Hon, as indicated in FIG. 2. The magnet 22 is not necessary if the thermocouple 10 and the first winding 16 are so designed as to generate a magnetic field intensity sufficient to close the contacts of the reed switch 20, i.e., if the first winding 16 generates a magnetic field intensity as indicated by the two-dot chain line b according to the thermoelectric current from the thermocouple 10.

The second winding 32 generates a magnetic field in the opposite direction to the total magnetic field generated by the first winding 16 and the magnet 22. Because the voltage across the diode 28 decreases in reverse proportion to the increase of the circumferential temperature, the amount of the current flowing through the second winding 32 decreases accordingly. The magnetic field intensity of the second winding 32 decreases as indicated by the broken line C. However, since the winding 32 is provided in an opposite sense to the winding 16, the magnetic field from winding 32 will oppose the field provided by winding 16 and magnet 22. As is apparent from FIG. 2, the total magnetic field intensity of the first and the second windings 16 and 32 and the permanent magnet 22, which is shown by a solid line d, therefore, is determined only by the factor of the temperature of the hot junction 12 independently from the circumferential temperature. Thus, the drifting of the threshold value depending on the circumferential temperature is eliminated.

Ordinarily, the output voltage of the battery 24 which is commonly installed in cars has a tendency to fluctuate over the range from 9 to 16 V during operation. However, it should be noted here that the voltage across a saturated diode is maintained almost constant. Even though, therefore, the voltage of the battery 24 fluctuates to produce more or less a deviation in the current flowing through the circuit including the warning device 26, resistor 30 and the diode 28, the voltage across the diode 28 remains almost constant. Accordingly, the current which excites the second winding 32 does not change irrespective of the fluctuation of the voltage of the battery 24.

When the reed switch 20 is closed, current flows from the positive pole of the battery 24 through the warning lamp 26, the reed switch 20 and the diode 28, to the negative pole of the battery 24. The warning lamp 26 at this time increases its brightness so as to be noticeable by the driver.

Figure 3:
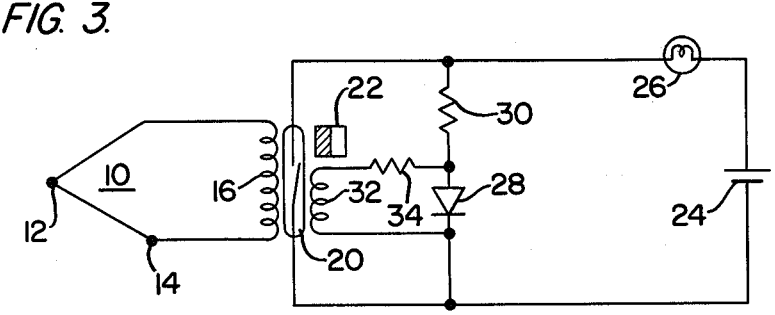
FIG. 3 shows a schematic diagram of one variation of the embodiment illustrated in FIG. 1.

In FIG. 3 there is illustrated another embodiment. All the elements used here are the same as those shown in FIG. 1 and are given the same reference numerals. The only structural difference from the apparatus shown in FIG. 1 is that the lower end of the reed switch 20 is connected to the cathode of the diode 28 instead of the anode thereof. The temperature responsive apparatus operates in the same way as that shown in FIG. 1.

Figure 4:
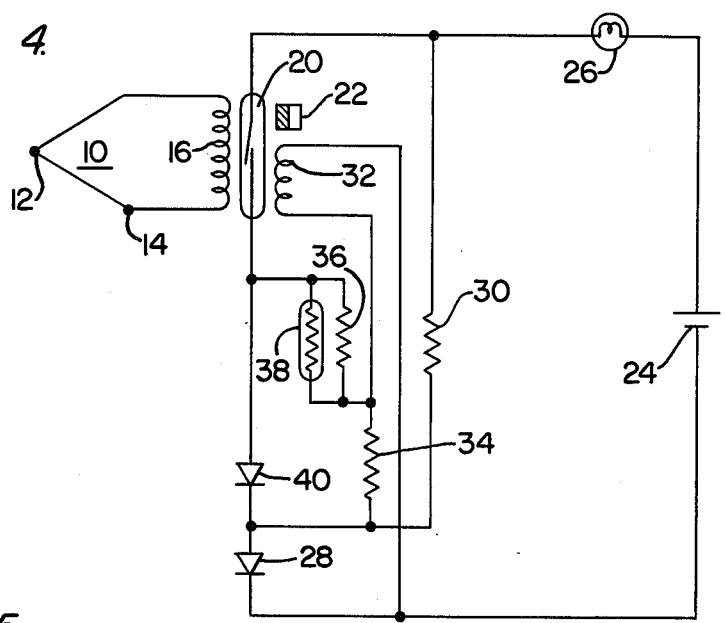
FIG. 4 is a schematic diagram of another embodiment in accordance with the present invention.

In FIG. 4 there is illustrated a temperature responsive apparatus further having a hysteresis compensating function. As is apparent from the figure, there is further provided a compensating circuit formed of a resistor 36, a thermistor 38 and a diode 40 in addition to the structure of the switching circuit shown in FIG. 1. Only the construction of the compensating circuit will be mentioned hereinafter. The resistor 36 and the thermistor 38, which are connected in parallel to each other, are inserted between the lower end of the reed switch 20 and the upper end of the resistor 34. The diode 40 of the compensating circuit is also connected between the lower end of the reed switch 20 and the anode of the diode 28.

In this embodiment a thermocouple of chromel and alumel is utilized because it shows a linear thermoelectric e.m.f. characteristic of 4.1 mV/100 deg. over the range from 250 to 1000°C. The first winding 16 is formed by copper wire of 1.6 mm$\phi$ and the number of turns thereof is twenty (20). The resistance value of the first winding 16 is 0.1 ($\Omega$). The second winding 32 has one thousand (1000) turns. The resistance values of the resistors 30, 34 and 36 and the warning lamp 26 are 270 ($\Omega$), 13 ($\Omega$), 50 ($\Omega$), and 42 ($\Omega$), respectively. The thermistor 38 has a resistance of 20 ($\Omega$) at 25° C. and varies its value at a rate of −0.2%/deg. C.

Figure 5:
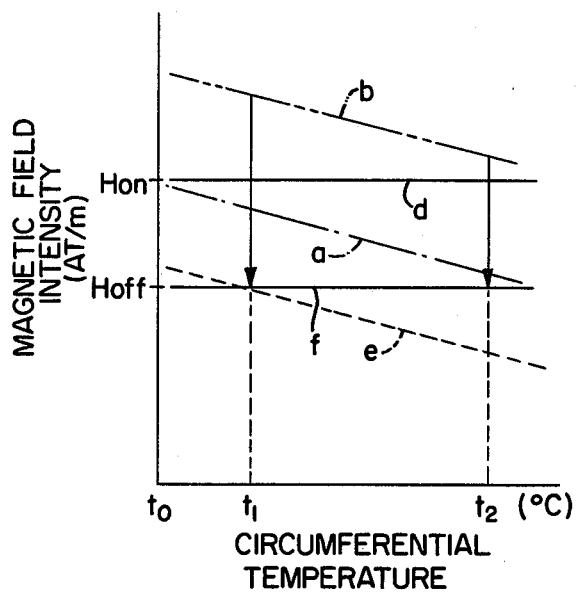
FIG. 5 shows the operating characteristics of the temperature responsive apparatus illustrated in FIG. 4.

The temperature responsive apparatus with the hysteresis compensating circuit as illustrated in FIG. 4 operates in the same way as that shown in FIG. 1, until the temperature at the hot junction 12 reaches the threshold value, i.e., 850°C. In the lower temperature region below 850° C. where reed switch 20 is open, no current flows through any of the resistor 36, the thermistor 38 and the diode 40, and the total magnetic field intensity applied to the reed switch 20 is determined by only the temperature at the hot junction 12 as described before. FIG. 5 also shows the variation of the magnetic field intensities of the first and the second windings 16 and 32 and the permanent magnet 22 by various lines a and b and a solid line d, respectively, against the circumferential temperature.

When the temperature at the hot junction 12 reaches the specified value which corresponds to the magnetic field intensity threshold value, the reed switch 20 is closed and current flows therethrough. A part of the current flows through the diode 40 into the diode 28 and the rest thereof flows through the parallel connection of the resistor 36 and the thermistor 38 and the resistor 34 into the diode 28. The voltage appearing across the resistor 34 that is represented by the following equation is applied across the terminals of the second winding 32;

$$V = V_{d28} + V_{d40} \frac{R_{34}}{(R_t // R_{36}) + R_{34}} \quad (2)$$

where $V_{d28}$ and $V_{d40}$ are voltages appearing across the diodes 28 and 40, and $R_{34}$, $R_{36}$ and $R_t$ are resistance values of the resistors 34 and 36 and the thermistor 38, respectively. The voltage V is greater by the voltage appearing across the resistor 34 than that appearing across the diode 28. The voltage across the resistor 34 is maintained at a constant value by the function of the thermistor 38 irrespective of the circumferential temperature.

The variation of the magnetic field intensity of the second winding 32 is shown by a broken line e in FIG. 5. The total magnetic field intensity applied to the reed switch 20 during the closing thereof is also determined by only the temperature at the hot junction 12 as indicated by a solid line f horizontal to the circumferential temperature. The threshold value of the magnetic field intensity at which the reed switch 20 is opened again is indicated by $H_{off}$. This means that the drifting of the threshold values by the circumferential temperature is compensated. The threshold value for the closing of the reed switch 20 can be set at a suitable level by the resistors 34 and 36 and the thermistor 38. Moreover, the temperature responsive apparatus operates accurately without undesirable influence of the voltage fluctuation of the battery 24 because of the function of the diodes 28 and 40.

Figure 6:
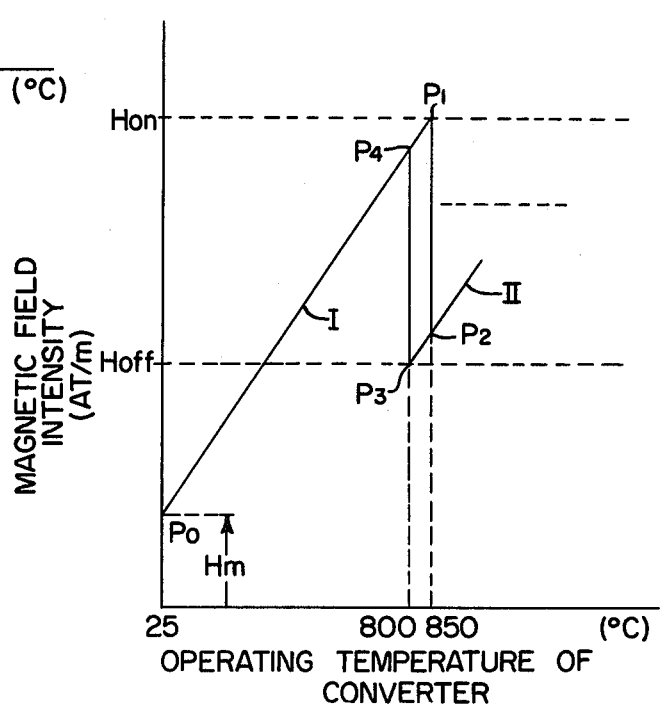
FIG. 6 shows the operation of the temperature responsive apparatus illustrated in FIG. 4 against operating temperature of a converter.

The explanation of operation will be given by reference to FIG. 6 hereinafter, under conditions when the temperature at the hot junction 12 increases gradually from the circumferential temperature, which is for example 25° C., up to a certain value 850°C. First, a point Po indicates the magnetic field intensity applied to the reed switch 20 when the temperature of the hot junction 12 is equal to the circumferential temperature. At this point, only the magnetic field of the intensity $H_m$ which is generated by the magnet 22 is applied to the reed switch 20 because the temperature difference between the hot junction 12 and the cold junction 14 is zero. The thermoelectric current from the thermocouple 10 increases proportionally to the temperature difference. The total magnetic field intensity applied to the reed switch 20, therefore, increases along a line I. When the temperature reaches a certain value 850° C. at a point p1, the total magnetic field intensity exceeds the threshold value H and the reed switch 20 is closed. As mentioned above, the temperature at which the reed switch 20 is closed is not affected by the circumferential temperature. After the closing of the reed switch 20, the compensating circuit begins its operation and the total magnetic field intensity is transferred from the line I to another line II (see points p1 and p2). During the closing of the reed switch 20, the warning lamp 26 is turned on and the high operational temperature of the catalytic converter will be noticed by the driver. Then, the driver must do something in order to decrease the operating temperature, for example, stop the engine operation. For a moment after the stopping of the enginge, the operating temperature at the hot junction 12 of the catalytic converter further increases and the total magnetic field intensity increases along the line II. Then, the temperature decreases and the magnetic field intensity decreases along the line II. When the operating temperature reaches, e.g., 800° C. at which the total magnetic field intensity decreases down to the threshold value $H_{off}$, the reed switch 20 is opened again. The total magnetic field intensity transfers from the line II to the line I (see points p3 and p4). The warning lamp 26 is turned off and the total magnetic field intensity decreases along the line I in dependence on the operating temperature at the hot junction 12.

Figure 7:
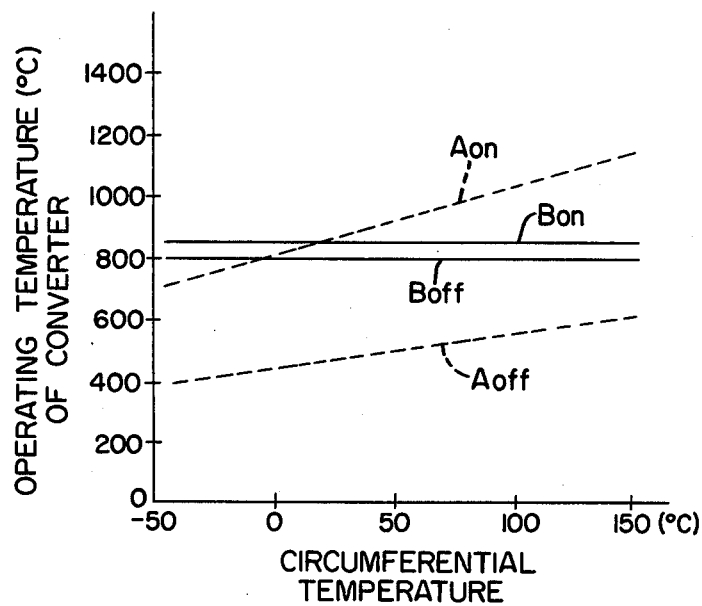
FIG. 7 shows operating characteristics of the temperature responsive apparatus illustrated in FIG. 4 and a conventional one.

In FIG. 7 there are shown the temperatures at which the reed switch 20 is closed and opened against the variation of the circumferential temperature. Broken lines $A_{on}$ and $A_{off}$ indicate the temperatures of the conventional temperature responsive apparatus, which are affected by the circumferential temperature. Solid lines $B_{on}$ and $B_{off}$ indicate the temperature of the temperature responsive apparatus shown in FIG. 4. As is apparent from the figure, the temperatures are maintained almost constant over the range from $-50°$ C. to $150°$ C. of the circumferential temperature. Moreover, the temperatures $B_{on}$ and $B_{off}$ can be set closely to each other, i.e., at $850°$ C., respectively.

Figure 8:
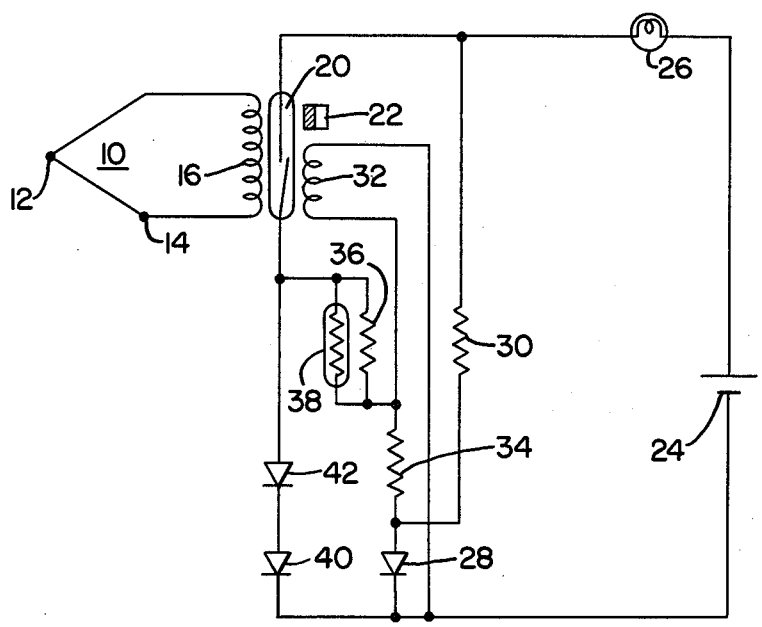
FIG. 8 shows a schematic diagram of one variation of the embodiment illustrated in FIG. 4.

In FIG. 8 there is illustrated one variation of the temperature responsive apparatus shown in FIG. 4. As is apparent from the figure, the difference from the apparatus shown in FIG. 4 resides in that a diode 42 is further provided between the lower terminal of the reed switch 20 and the diode 40 in series and that the anode of the diode 40 is connected to the anode of the diode 28 instead of the cathode thereof. The voltage which is greater than that appearing across the diode 28 appears across the series connection of the diodes 40 and 42 during the closing of the reed switch to be applied to the second winding 32. the operation of this temperature responsive apparatus is substantially the same as that of FIG. 4.

While we have shown and described several embodiments in accordance with the present invention, it is to be understood that the same is not limited thereto but is susceptible of numerous changes and modifications as are obvious to those of skill in the art, and we therefore do not wish to be limited to the details shown and described herein but intend to cover all such changes and modifications as known to those of ordinary skill in the art.

What is claimed:

1. A temperature responsive apparatus comprising a voltage source, a thermocouple producing a thermoelectric e.m.f. depending on the temperature difference between the temperature to be detected and the circumferential temperature, a first winding supplied with current from the thermocouple to generate a first magnetic field, a second winding generating a second magnetic field in the opposite direction to that generated by said first winding, and a reed switch positioned in the total magnetic field generated by said first and second windings and responding to the intensity of the total magnetic field to make and break its contacts, and at least one diode connected to said voltage source for providing a voltage drop thereacross which varies in dependence on changes in the circumferential temperature, said second winding being connected in parallel to said diode so as to be excited in accordance with variations in said voltage drop across said diode.

2. The temperature responsive apparatus of claim 1, characterized in that said diode is connected to said voltage source through a resistor and the reed switch is connected in parallel to said resistor.

3. The temperature responsive apparatus of claim 1, characterized in that said diode is connected to said voltage source through a resistor and the reed switch is connected in parallel to the series connection of said diode and said resistor.

4. The temperature responsive apparatus of claim 1, further comprising compensating circuit means for applying additional current to said second winding when said reed switch is closed.

5. The temperature responsive apparatus of claim 4, characterized in that said compensating circuit means comprises a further diode connected in series with said reed switch and through which current flows when said reed switch is closed and means for adding the voltage drop across said further diode to the voltage drop across said first-recited diode.

6. The temperature responsive apparatus of claim 5, characterized in that a thermistor is connected with said further diode and the voltage drop across said further diode is regulated by said thermistor in accordance with the circumferential temperature.

7. The temperature responsive apparatus of claim 1, further comprising means for generating a bias magnetic field through said reed switch in the same direction as the magnetic field generated by said first winding.

8. The temperature responsive apparatus of claim 7, characterized in that said bias magnetic field generating means comprises a permanent magnet disposed beside said reed switch.

9. A temperature responsive apparatus comprising a thermocouple producing a thermoelectric e.m.f. depending on the temperature difference between the temperature to be detected and the circumferential temperature, a first winding connected to said thermocouple to generate a first magnetic field, a second winding disposed to generate a second magnetic field in the opposite direction to that generated by said first winding, a reed switch positioned in the total magnetic field generated by said first and second windings and being responsive to the intensity of said total magnetic field to make and break its contacts, indicator means for providing a visual or audible indication, a voltage source, a diode connected in series with said reed switch and said indicator means across said voltage source, a first resistor connected across said reed switch, and a second resistor connected in series with said second winding across said diode, said diode providing a variable voltage drop thereacross in dependence upon changes in the circumferential temperature.

10. The temperature responsive apparatus of claim 9, further comprising compensating means connecting one end of said second winding to one side of said reed switch for applying additional current to said second winding when said reed switch is closed.

11. The temperature responsive apparatus of claim 10, characterized in that said compensating circuit means comprises a further diode connected in series with said reed switch and through which current flows when said reed switch is closed and means for adding the voltage drop across said further diode to the voltage drop across said first-recited diode.

12. The first-recited apparatus of claim 10, wherein said compensating circuit means comprises a further diode connected in series between reed switch and said temperature responsive diode and a thermistor connected between one side of said reed switch and the point of connection of said second resistor and said second winding.

13. The temperature responsive apparatus of claim 12, wherein a third resistor is connected in parallel to said thermistor.

14. The temperature responsive apparatus of claim 11, further comprising means for generating a bias magnetic field through said reed switch in the same direction as the magnetic field generated by said first winding.

15. The temperature responsive apparatus of claim 14, characterized in that said bias magnetic field generating means comprises a permanent magnet disposed beside said reed switch.

16. A temperature responsive apparatus comprising a thermocouple producing a thermoelectric e.m.f. depending on the temperature difference between the temperature to be detected and the circumferential temperature, a first winding connected to said thermocouple to generate a first magnetic field, a second winding disposed to generate a second magnetic field in the opposite direction to that generated by said first winding, a reed switch positioned in the total magnetic field generated by said first and second windings and being responsive to the intensity of said total magnetic field to make and break its contacts, indicator means for providing a visual or audible indication, a voltage source, said reed switch and said indicator means being connected in series across said voltage source, a diode and a first resistor connected in series across said reed switch, and a second resistor connected in series with said second winding across said diode, said diode providing a variable voltage drop thereacross in dependence upon changes in the circumferential temperature.

17. The temperature responsive apparatus of claim 16, further comprising compensating means connecting one end of said second winding to one side of said reed switch for applying additional current to said second winding when said reed switch is closed.

18. The temperature responsive apparatus of claim 17, characterized in that said compensating circuit means comprises a further diode connected in series with said reed switch and through which current flows when said reed switch is closed and means for adding the voltage drop across said further diode to the voltage drop across said first-recited diode.

19. The temperature responsive apparatus of claim 17, wherein said compensating means comprises a further diode connected in series with said reed switch, and a thermistor connected between the point of connection of said reed switch and said further diode and the point of connection of said second resistor and said second winding.

20. The temperature responsive apparatus of claim 19, wherein a third resistor is connected in parallel to said thermistor.

21. The temperature responsive apparatus of claim 16, further comprising means for generating a bias magnetic field through said reed switch in the same direction as the magnetic field generated by said first winding.

22. The temperature responsive apparatus of claim 21, characterized in that said bias magnetic field generating means comprises a permanent magnet discposed beside said reed switch.

* * * * *